United States Patent

Theilemann et al.

(10) Patent No.: US 8,720,402 B2
(45) Date of Patent: *May 13, 2014

(54) INTERNAL COMBUSTION ENGINE

(75) Inventors: Ludwig Theilemann, Schomberg (DE);
Joachim Scheiba,
Knittlingen-Hohenklingen (DE);
Friedrich Seiler, Pforzheim (DE)

(73) Assignee: Dr. Ing. h.c. F. Porsche Aktiengesellschaft, Stuttgart (DE)

( * ) Notice: Subject to any disclaimer, the term of this patent is extended or adjusted under 35 U.S.C. 154(b) by 737 days.

This patent is subject to a terminal disclaimer.

(21) Appl. No.: 12/597,929

(22) PCT Filed: Jun. 21, 2008

(86) PCT No.: PCT/EP2008/005022
§ 371 (c)(1),
(2), (4) Date: Oct. 28, 2009

(87) PCT Pub. No.: WO2009/010151
PCT Pub. Date: Jan. 22, 2009

(65) Prior Publication Data
US 2010/0139603 A1 Jun. 10, 2010

(30) Foreign Application Priority Data
Jul. 16, 2007 (DE) .......................... 10 2007 033 324

(51) Int. Cl.
*F02M 35/10* (2006.01)
(52) U.S. Cl.
USPC ............ 123/184.53; 123/184.47; 123/184.36; 123/184.57; 60/605.1
(58) Field of Classification Search
USPC ............... 123/198 E, 184.21, 184.55, 184.54, 123/184.53, 184.56, 396, 399, 336, 184.47, 123/184.36, 184.57; 251/129.12; 181/250, 181/299, 246; 60/605.1

See application file for complete search history.

(56) References Cited

U.S. PATENT DOCUMENTS 3,254,484 A * 6/1966 Kopper ............................ 60/275
3,796,048 A * 3/1974 Annus et al. .................. 60/605.1
(Continued)

FOREIGN PATENT DOCUMENTS

DE  3 627 312 A1  2/1987
DE  100 02 482 A1  7/2001
(Continued)

OTHER PUBLICATIONS

International Search Report, dated Dec. 9, 2008 (with English translation).

*Primary Examiner* — Lindsay Low
*Assistant Examiner* — Kevin Lathers
(74) *Attorney, Agent, or Firm* — RatnerPrestia

(57) ABSTRACT

An internal combustion engine having a plurality of cylinders and an air intake system, with the air intake system formed from at least one distributor pipe, a plurality of intake pipes and at least one plenum, and with the plenum positioned between the distributor pipe and the intake pipes. Here, the combustion air is fed to the air intake system via an air guiding duct which opens out into the distributor pipe, with the charge pressure of the combustion air reduced between the outlet out of the compressor and the inlet into the combustion chamber. A distributor pipe length is dimensioned as a function of an equivalent distributor pipe diameter such that it is possible for a reduction in the charge pressure to be obtained within the air intake system by expansion taking place partially in the plenum in the respective intake pipe and/or within the distributor pipe.

16 Claims, 7 Drawing Sheets

(56) References Cited

U.S. PATENT DOCUMENTS

| | | | |
|---|---|---|---|
| 4,541,381 A * | 9/1985 | Sugiura | 123/406.67 |
| 5,740,770 A | 4/1998 | Morota | |
| 6,105,555 A * | 8/2000 | Weber et al. | 123/493 |
| 6,192,850 B1 * | 2/2001 | Rutschmann et al. | 123/184.57 |
| 6,250,272 B1 | 6/2001 | Rutschmann et al. | |
| 8,281,761 B2 * | 10/2012 | Theilemann | 123/184.42 |
| 2003/0172653 A1 * | 9/2003 | Mayer et al. | 60/602 |
| 2005/0279311 A1 * | 12/2005 | Fegg et al. | 123/184.36 |

FOREIGN PATENT DOCUMENTS

| | | | | |
|---|---|---|---|---|
| EP | 0 790 394 A2 | 8/1997 | | |
| EP | 0 987 412 A2 | 3/2000 | | |
| EP | 1 217 187 A1 * | 6/2002 | | F02B 27/02 |
| EP | 1217187 A1 | 6/2002 | | |
| EP | 1217187 A1 * | 6/2002 | | |
| JP | 57-51910 | 3/1982 | | |
| JP | H02-30919 | 2/1990 | | |
| JP | 2002188536 A | 7/2002 | | |

* cited by examiner

INTERNAL COMBUSTION ENGINE

CROSS REFERENCE TO RELATED APPLICATIONS

This is a U.S. National Phase application of PCT application number PCT/EP2008/005022, filed Jun. 21, 2008 which claims priority benefit of DE 10 2007 033 324.4, filed Jul. 16, 2007, each of which is incorporated herein by reference in its entirety.

FIELD OF THE INVENTION

The invention relates to an internal combustion engine, in particular a spark-ignition internal combustion engine, having a compressor.

BACKGROUND OF THE INVENTION

In the operation of internal combustion engines, use is conventionally made of air intake systems which provide ram or resonance pipe charging or a combination of these two charging types. In the case of a supercharged internal combustion engine, the compression of the combustion air which is sucked in results in an increase in the air temperature. Further charging is avoided and a charge-air cooler for cooling the charge air is therefore positioned downstream of a compressor. This is intended to minimize the risk of a knocking engine. A further reduction in the charge-air temperature by means of a larger charge-air cooler is generally not possible for structural reasons. Accordingly, to increase the efficiency of the charge-air cooler, expansion devices are provided downstream thereof in order to further reduce a combustion air temperature. DE 100 02 482 A1 discloses for example a device for charge-air cooling of said type, in which the combustion air which is at an increased charge pressure is expanded at a back-pressure valve. Here, the back-pressure valve is positioned between the charge-air cooler and the air intake system of the internal combustion engine.

DE 36 27 312 A1 likewise discloses an expansion control device for lowering the charge-air temperature, by means of which expansion control device an adiabatic partial expansion of the supercharged air is obtained. Here, the expansion control device has a nozzle-like line section which is designed in the manner of a laval nozzle, with the nozzle-like line section being arranged in the intake line upstream of the air intake system. The measures known from the prior art for cooling the charge air downstream of the outlet out of the charge-air cooler necessitate the arrangement of an expansion device in the intake line, and thereby entail additional structural expenditure in the engine bay of the vehicle.

SUMMARY OF THE INVENTION

The invention relates to an object of providing a supercharged internal combustion engine in which an expansion of the charge air can be obtained without structural expenditure, according to aspects of the invention.

The internal combustion engine according to aspects of the invention is characterized in that a distributor pipe length is dimensioned as a function of an equivalent distributor pipe diameter such that it is possible for a reduction in the charge pressure to be obtained within the air intake system of the internal combustion engine by means of an expansion, with the charge-air expansion taking place partially in the plenum, in the respective intake pipe and/or within the distributor pipe. According to aspects of the invention, it is possible to obtain a continuous, but not imperatively uniform, expansion between the inlet of the combustion air into the distributor pipe and the outlet out of the intake pipe.

With the design of the air intake system according to aspects of the invention, by means of the expansion which is obtained, effective cooling of the charge air within the air intake system is provided without using additional moving components. In this way, a cost-effective and efficient air intake system for supercharged internal combustion engines is provided, with the expansion air intake system according to aspects of the invention being suitable both for supercharged spark-ignition engines and also for diesel engines.

In particular, by means of the present invention, the tendency of a supercharged spark-ignition engine toward knocking combustion is minimized. It is thereby possible for the displacement of the ignition angle in the direction of the optimum value to be obtained even at high rotational speeds, since a reduction in the mixture temperature is generated. This is because, by means of the air intake system according to aspects of the invention, a gas-dynamic compression downstream of the charge-air cooler is prevented and, in addition, an expansion is obtained within the air intake system with a reduction in temperature of the combustion air.

In one embodiment of the invention, the distributor pipe length is dimensioned as a function of a nominal rotational speed of the internal combustion engine. Optimum use of the present air intake system is therefore made in supercharged internal combustion engines, and targeted tuning for higher load points and rotational speeds is permitted in particular in sports cars.

In a further embodiment of the invention, the distributor pipe length is designed as a function of an equivalent distributor pipe diameter such that a ratio of equivalent distributor pipe diameter to distributor pipe length is 0.05 to 0.14. Here, the intake pipe length should be dimensioned to be no more than 200 mm or 150 mm, in particular at a nominal rotational speed of between 5500 and 7000 revolutions per minute. Here, the ratio of equivalent distributor pipe diameter to distributor pipe length is preferably 0.066, 0.114 or 0.136. In this way, an optimized expansion of the compressed combustion air takes place within the air intake system, such that the combustion air flows at a considerably lower temperature from the air intake system into the inlet duct in the cylinder head.

As a result of the new geometric design of the distributor pipe of the air intake system, a distributor pipe is provided which has a small diameter in relation to conventional intake systems, such that the structural expenditure in the engine bay is optimized. By means of the dimensioning according to aspects of the invention, the air intake system according to aspects of the invention completely reverses the known resonance charging effect, in particular at high engine rotational speeds. Instead of a compression, an expansion of the combustion air is obtained, and said combustion air is cooled further. The fuel/air mixture in the combustion chamber is therefore at a lower temperature, so that the ignition time of the internal combustion engine can be set optimally in terms of performance. It is therefore possible to obtain an improvement in engine efficiency and, at the same time, a higher engine power together with favorable fuel consumption, in particular at high loads and rotational speeds.

In a further embodiment of the invention, the internal combustion engine has one or two cylinder rows, with the total number of cylinders being six. According to aspects of the invention, it has been found in a spark-ignition 6-cylinder internal combustion engine of the Boxer type that the present air intake system leads to a considerable improvement in efficiency. The present air intake system is nevertheless likewise suitable for internal combustion engines with four cylinders.

In one embodiment of the invention, to obtain a further improvement in the cylinder charge, in particular in supercharged spark-ignition internal combustion engines, the present invention provides an additional increase in the charge pressure by the compressor in order to compensate the reduced charge-pressure contribution by the expansion obtained within the air intake system. A charge pressure which is higher by 5 to 15% than the conventional charge pressures is preferably set. Here, the conventional charge pressures are between 0.9 bar and 1.5 bar.

As a result of a higher charge pressure being set, the combustion air temperature downstream of the compressor increases, such that as a result of the higher temperature level of the combustion air which is set, a greater quantity of heat is dissipated in the charge-air cooler. According to aspects of the invention, a temperature difference across the charge-air cooler is provided which is approximately 5 to 15% higher than at conventional charge pressures. In this way, a combustion air temperature downstream of the charge-air cooler is only slightly higher than that obtained with conventional supercharging, since the heat quantity dissipated at the charge-air cooler is between 3 and 10% higher than under conventional charge pressure conditions. The additional thermal gain obtained by means of the use of the air intake system according to aspects of the invention leads to a lower temperature of the fuel/air mixture in the combustion chamber, since both the pressure level and also the temperature level in the combustion chamber at the inlet valve closing time are between 3 and 4% lower than in conventional air intake systems. Accordingly, in a sports vehicle with a supercharged engine, it is possible, in particular at high load points and rotational speeds, to obtain a more favorable fuel consumption or a higher engine power for the same fuel consumption.

In a further advantageous embodiment of the invention, in the internal combustion engine according to aspects of the invention, as a result of the use of an exhaust-gas turbocharger with a variable turbine geometry in combination with the expansion air intake system according to aspects of the invention, the obtained expansion of the combustion air within the air intake system is constantly adapted to the operating state of the engine. In this way, it is possible in the internal combustion engine according to aspects of the invention to obtain an optimization of the ignition time and therefore a further improvement in efficiency.

BRIEF DESCRIPTION OF THE DRAWINGS

Further features and combinations of features can be gathered from the description. Physical exemplary embodiments of the invention are illustrated in simplified form in the drawings and are explained in more detail in the following description. In the drawings.

DETAILED DESCRIPTION OF EXEMPLARY EMBODIMENTS OF THE INVENTION

An internal combustion engine 1 with supercharging has at least one cylinder 2 in which a combustion chamber (not illustrated) is formed between a piston, which is held in the cylinder 2 in a longitudinally movable manner, and a cylinder head. The internal combustion engine 1 sucks in combustion air by means of a compressor 8. The supercharging of the internal combustion engine 1 can be generated within the context of the invention by a compressor 8 which is formed as a constituent part of an exhaust-gas turbocharger, of a mechanical compressor or of an electrical compressor. As a result of the compression of the combustion air, the charge-air temperature increases. In order to reduce said charge-air temperature, a charge-air cooler 9 is positioned downstream of the compressor 8.

Figure 1:
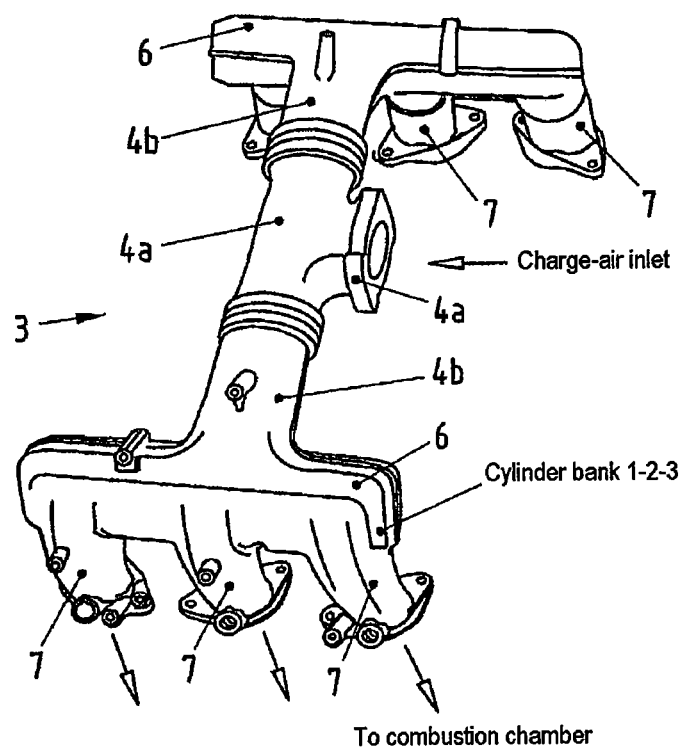
FIG. 1 shows an image of an air intake system according to aspects of the invention with cylinders arranged in two rows.

FIG. 1 shows an air intake system 3 which is embodied according to aspects of the invention and in which charge air is fed into a distributor pipe 4 through an air guiding duct 5. The air intake system 3 illustrated in FIG. 1 is designed for an internal combustion engine 1 with two cylinder rows such that one intake manifold or plenum 6 is provided for each cylinder row. Three intake pipes 7 per cylinder row are provided on each plenum 6, via which intake pipes 7 the charge air can be supplied to the inlet duct (not illustrated) in the cylinder head and subsequently to the combustion chamber. The two plenums 6 are connected to a central distributor pipe 4. Here, the respective plenum 6 is formed in one piece with the intake pipes 7. According to the present invention, a distributor pipe 4 is arranged between the two plenums 6, which distributor pipe 4 is formed in the present exemplary embodiment from a distributor module 4a and from two pipe sections 4b which are formed in one piece with the respective plenum. The connection can take place by means of clips or with a bayonet-type fastener.

According to aspects of the invention, a distributor pipe length $L_V$ is dimensioned as a function of an equivalent distributor pipe diameter $D_V$ such that a reduction in the charge pressure of the combustion air takes place within the air intake system 3 by means of a targeted expansion, with the expansion taking place partially in the plenum and/or within the distributor pipe. According to aspects of the invention, the expansion takes place in a region between an inlet of the combustion air into the distributor pipe 4, for example from the distributor module 4a, and an outlet out of the intake pipe 7. Depending on the ignition sequence of the respective cylinders 2, an oscillation occurs within the air intake system, with it being possible to obtain a continuous, but not imperatively uniform, expansion of the charge air in relation to the respective combustion chamber within the air intake system. In this way, the charge-air temperature at the inlet into the combustion chamber and therefore the fuel/air mixture temperature in the combustion chamber can be lowered, such that the engine power can be increased with a simultaneous reduction in the specific fuel consumption.

According to the present invention, the oscillating air in the intake tract is sucked in for mixture preparation during the relatively cool expansion phase, as a result of which the temperature of the fuel/air mixture in the combustion chamber is reduced. This means a considerable increase in efficiency: A reduction in fuel consumption by approximately 15 percent is obtained at maximum power of a six-cylinder Boxer engine.

The expansion intake system 3 described here is highly suitable for internal combustion engine 1 with six or four cylinders. For a supercharged six-cylinder engine, the distributor pipe length $L_V$ is determined by means of the following formula:

$$200-4/3*L_S+1.7*n_N^{-2.22}*(Dv-30)<L_V<7.2*10^6/n_N-1.5*L_S$$

In the case of a supercharged four-cylinder engine, the range for the distributor pipe length $L_V$ in which the expansion intake system can obtain advantageous results is determined by the following formula:

$$34*D_V-650-4/3*L_S<L_V$$

Here, $L_S$ corresponds to an intake pipe length between the plenum 6 and the cylinder head (not illustrated). The value $L_V$ represents the distributor pipe length, wherein the latter is determined differently depending on the exemplary embodiment. $L_V$ is the pipe length of the connecting pipe between the first and the second plenum 6. In the exemplary embodiments with the tank 4c and 11 as per FIGS. 3 and 5 respectively, $L_V$ is the sum of the distributor pipe sections $L_V=L_{V1}+L_{V2}$. Furthermore, $n_N$ corresponds to a nominal rotational speed of the internal combustion engine, at which a maximum power is obtained.

In the case of a distributor pipe 4 with a variable cross-sectional area $A_V(x)$, the internal volume $V_V$ of the connecting pipe is determined by means of the following formula:

$$V_V=\int A_V(x)dx, \text{where } A_M=V_V/L_V$$

Here, x is the path coordinate along a pipe center line. Regions in which $A_V(x)$ is greater than double the mean cross-sectional area $A_M$ are considered to be not a tube but a tank, and are not included in the calculations of the pipe length $L_V$ and of the equivalent connecting pipe diameter $D_V$.

From this, the equivalent connecting pipe diameter $D_V$ is determined according to the formula:

$$D_V=\sqrt{4A_M/\pi}$$

Figure 2:
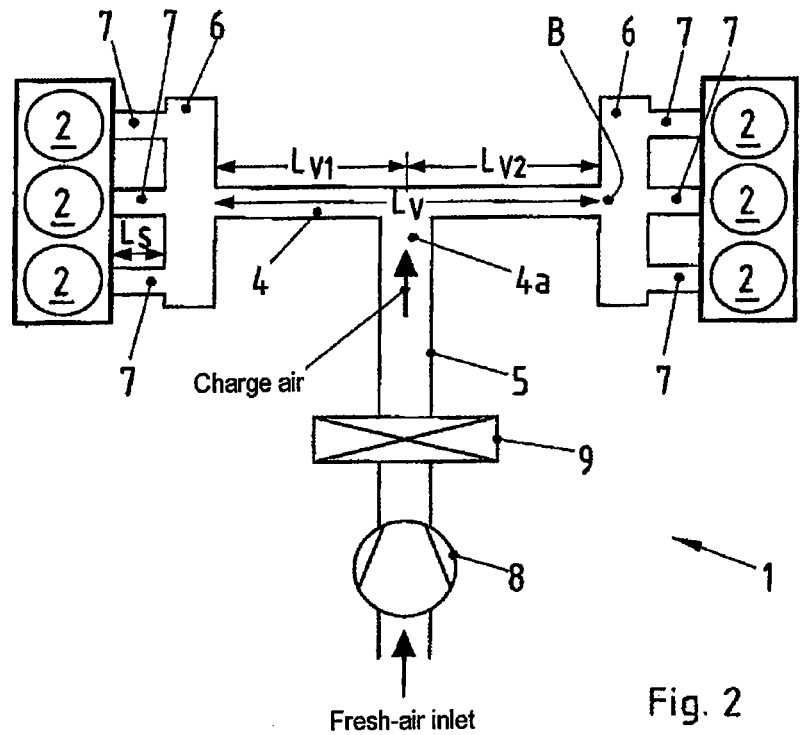
FIG. 2 is a schematic illustration of the air intake system according to FIG. 1 as per a first exemplary embodiment.

In the first exemplary embodiment as per FIG. 2, the distributor pipe length $L_V$ is equal to the spacing between the two plenums 6. In the second exemplary embodiment as per FIG. 3, the distributor pipe length $L_V$ is composed of the lengths of the two sections $L_{V1}$ and $L_{V2}$, wherein in the third exemplary embodiment as per FIG. 4, the distributor pipe length of corresponds to the curve length of the distributor pipe 4. In the fourth exemplary embodiment as per FIG. 5, the distributor pipe length $L_V$ is composed of the two section lengths $L_{V1}$ and $L_{V2}$. In the fifth exemplary embodiment, according to FIG. 6, the distributor pipe length $L_V$ is equal to the spacing between the two plenums 6, wherein in the sixth exemplary embodiment as per FIG. 7, the distributor pipe length corresponds to the curve length of the distributor pipe.

According to aspects of the invention, a design of the expansion intake system 3 which adheres to the above formulae results in advantageous low temperatures at the inlet opening of the combustion chamber. It is possible to obtain high degrees of expansion in the case in particular of a distributor pipe length of approximately 440 mm and an equivalent distributor pipe diameter $D_V$ of 50 or 60 mm or between 50 and 60 mm. Here, the intake pipes 7 have a length $L_S$ which is less than 200 or 150 mm, preferably between 110 and 140 mm. Accordingly, the design of the distributor pipe length $L_V$ is to be selected as a function of the equivalent distributor pipe diameter $D_V$ so as to give a ratio of equivalent distributor pipe diameter $D_V$ to distributor pipe length $L_V$ in a range from 0.05 to 0.14, in particular in a range from 0.06 to 0.13. It has been found here that, in a six-cylinder engine, ratios of 0.066, 0.114 or 0.136 or ratios which lie between these values have led to optimum results within the context of the present invention, in particular if the intake pipe length $L_S$ is shorter than 150 mm.

The internal combustion engine 1 described here operates on the four-stroke principle, with the present invention likewise being suitable for two-stroke internal combustion engines. The longitudinal movement of the piston extends between a top dead center TDC and a bottom dead center BDC. In the first intake stroke of the four-stroke internal combustion engine 1, combustion air is supplied to the combustion chamber through an inlet duct or an intake pipe 7, with the piston moving in a downward movement to a gas-exchange bottom dead center. In a subsequent compression stroke, the piston moves in an upward movement to an ignition top dead center ITDC, around which the ignition is carried out. Thereafter, the piston expands in a downward movement to a bottom dead center, wherein in a final stroke, the piston, in an upward movement to a gas-exchange top dead center CE-TDC, forces the gases out of the combustion chamber.

The plenums 6 shown in FIG. 2 are connected to the distributor pipe 4, with said distributor pipe 4 being designed such that the combustion air is supplied to the respective combustion chamber at a time at which, in the plenum 6, a charge-air pressure prevails which is lower than the charge-air pressure which prevails in the air guiding duct 5. To illustrate the effect obtained by means of the air intake system 3 according to aspects of the invention, FIG. 8 illustrates some air state profiles in the plenum 6 and in the intake pipe 7 of the internal combustion engine 1.

Figure 8:
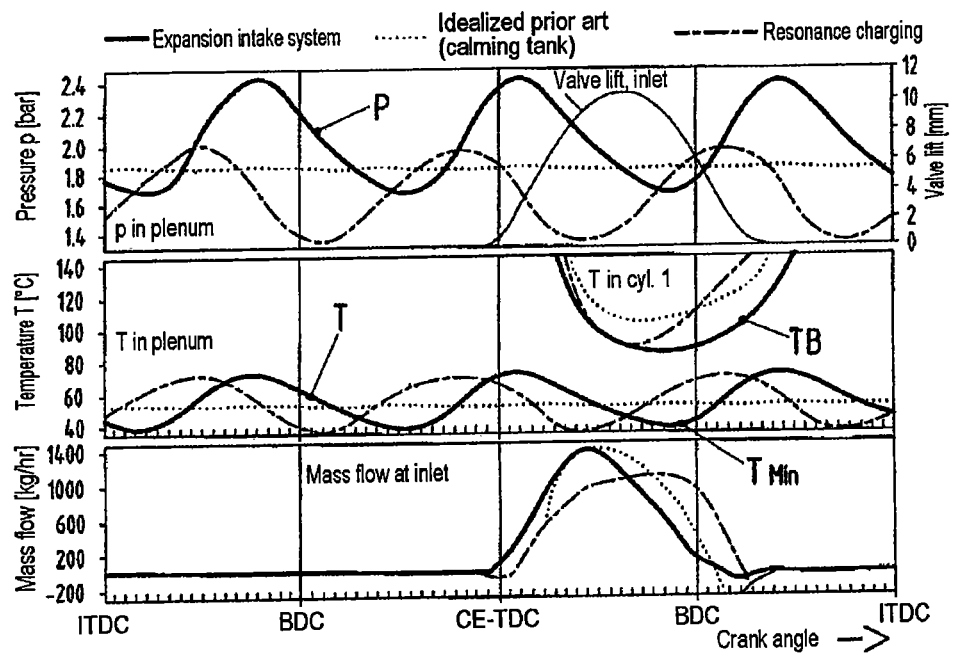
FIG. 8 shows a schematic diagram of the pressure, temperature and mass flow profiles within the air intake system of the internal combustion engine according to aspects of the invention.

As can be seen in the upper diagram of FIG. 8, a maximum valve lift is set at the inlet in a second half of the intake stroke, that is to say between charge-exchange top dead center CE-TDC and bottom dead center BDC. As illustrated in the middle diagram in FIG. 8, the temperature of the combustion air has a minimum value $T_{min}$ in the second half of the intake stroke as a result of the expansion in the plenum 6. The air intake system 3 according to aspects of the invention is designed such that, at the time of the intake of combustion air, a gas-dynamic expansion prevails within the air intake system 3, in particular in the plenum 6 and in the intake pipes 2. In this way, the combustion air substantially has a low temperature $T_{min}$ when the combustion air flows into the combustion chamber.

Figure 3:
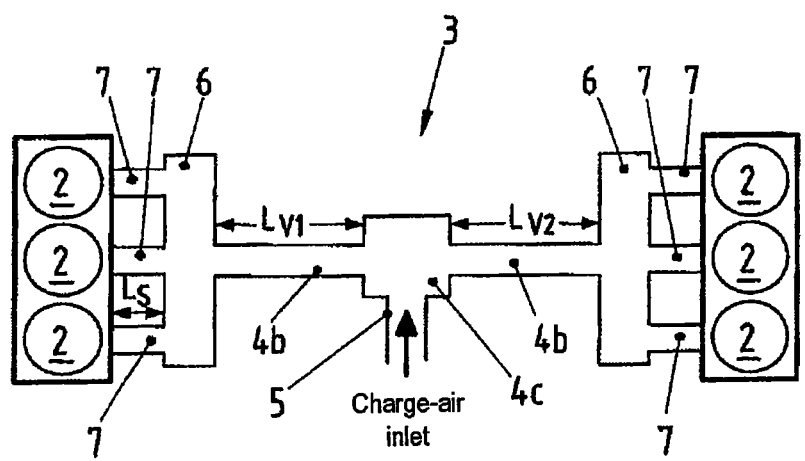
FIG. 3 is a schematic illustration of the air intake system as per FIG. 1 as per a second exemplary embodiment.
Figure 4:
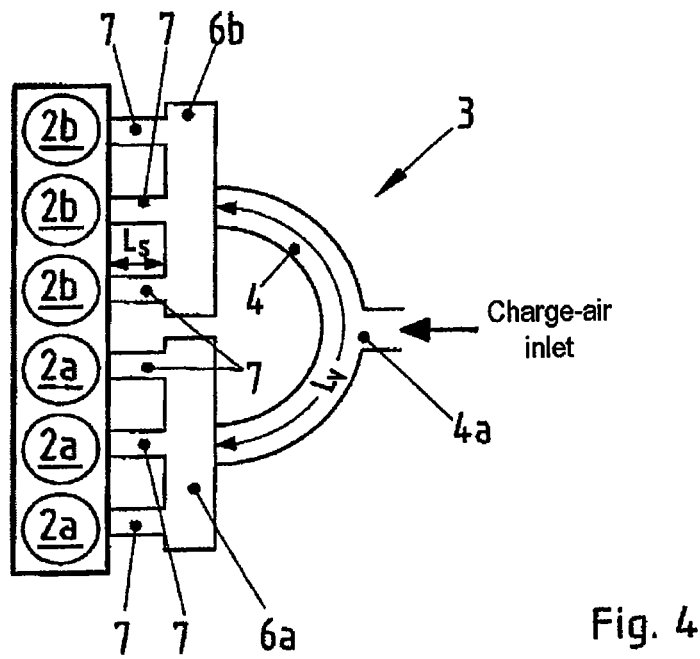
FIG. 4 is a schematic illustration of an air intake system according to aspects of the invention with cylinders arranged in one row, as per a third exemplary embodiment.

FIG. 3 illustrates a second exemplary embodiment in which a tank 4c is provided in the center of the distributor pipe 4 instead of the distributor module 4a. In this exemplary embodiment, the distributor pipe length $L_V$ is composed of the spacings between the respective plenum 6 and the tank 4c. According to a third exemplary embodiment as per FIG. 4, the internal combustion engine 1 according to aspects of the invention likewise has six cylinders which are arranged in a row. Here, the air intake system 3 is designed such that the combustion air is split up in such a way that a first plenum 6a is provided for the three front cylinders 2a, with a second plenum 6b being provided for the other three cylinders 2b. For this purpose, the distributor pipe 4 is of curved design, with the distributor pipe length $L_V$ corresponding to the length of the curve. According to aspects of the invention, the distributor pipe 4 can, depending on the cylinder arrangement and engine design, be of any conceivable form within the context of the invention, for example curved, straight or angular, or can be designed as a combination of different forms.

Figure 5:
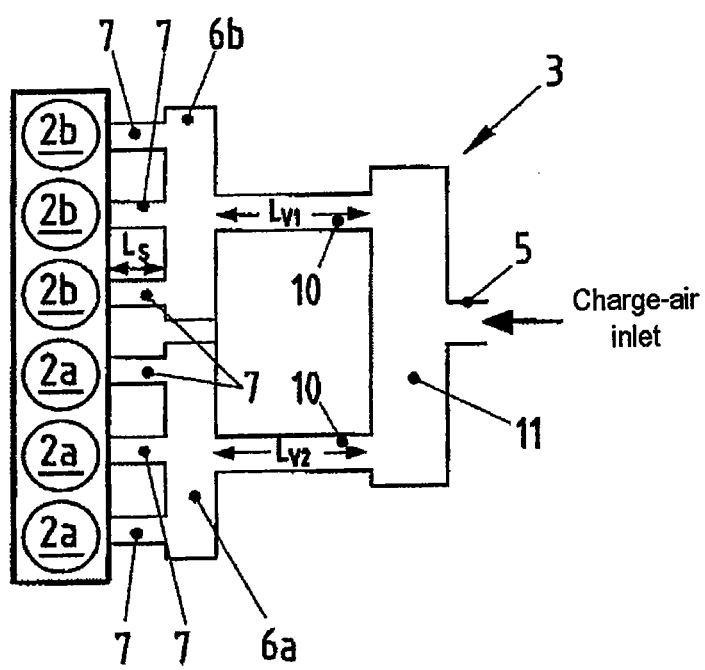
FIG. 5 is a schematic illustration of the air intake system as per FIG. 4 as per a fourth exemplary embodiment.

A modified form of the third exemplary embodiment as per a fourth exemplary embodiment is illustrated in FIG. 5, with the distributor pipe 4 being split up here into two sections, with a tank 11 being positioned between the air guiding channel 5 and the respective distributor pipe sections 10. In this exemplary embodiment, the distributor pipe length $L_V$ is composed of the two distributor pipe section lengths $L_{V1}$ and $L_{V2}$.

Figure 6:
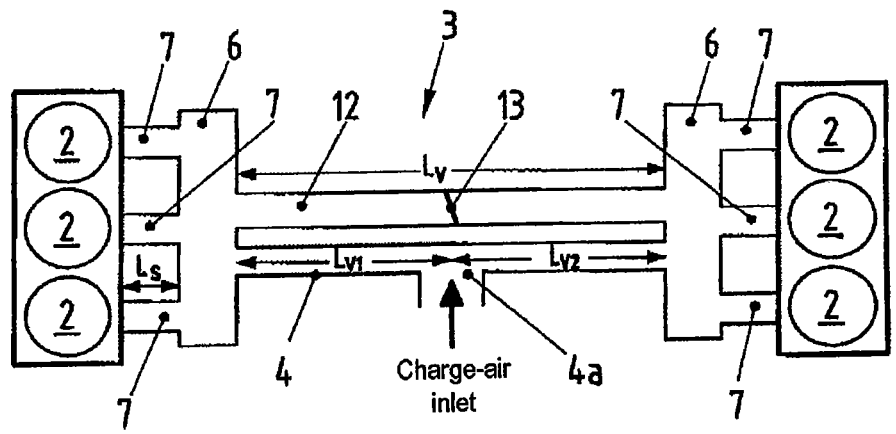
FIG. 6 is a schematic illustration of the air intake system as per FIG. 1 as per a fifth exemplary embodiment.
Figure 7:
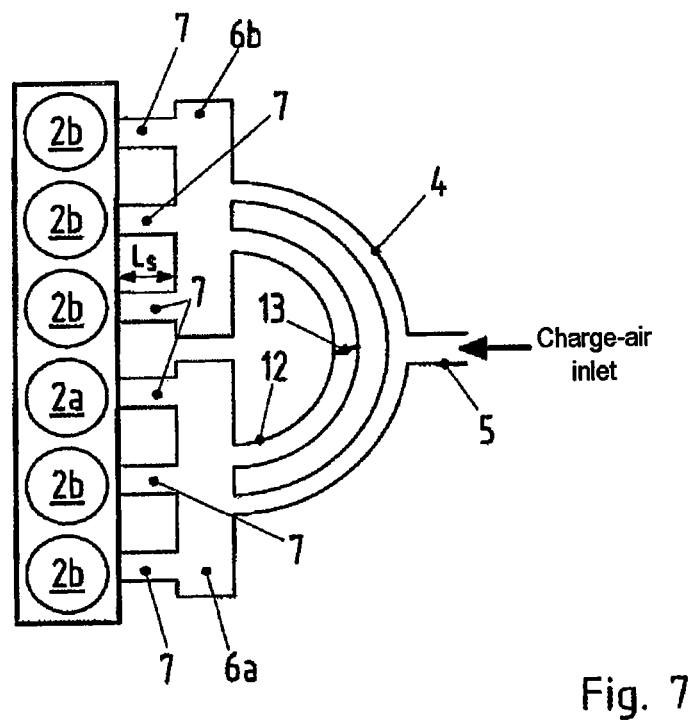
FIG. 7 is a schematic illustration of the air intake system as per FIG. 4 as per a sixth exemplary embodiment.

According to a fifth exemplary embodiment of the invention as per FIG. 6, an additional distributor pipe 12 is arranged between the plenums 6, which additional distributor pipe 12 can be activated as a function of engine parameters by a switching element, embodied in this case as a flap 13. The switching flap 13 arranged in the additional distributor pipe 12 serves to adjust the size of the equivalent distributor pipe diameter $D_V$. In this way, the obtainable expansion of the charge air can be adjusted as a function of the rotational speed of the internal combustion engine 1. The arrangement of an additional distributor pipe 12 with a switching flap 13 is likewise conceivable in all of the exemplary embodiments described above. Here, depending on the form of the distributor pipe, one or two additional distributor pipes 12 are to be positioned at the corresponding points for adjusting the size of the equivalent distributor pipe diameter $D_V$. The sixth embodiment shown in FIG. 7 represents a modified form of the fifth embodiment from FIG. 4.

Figure 12:
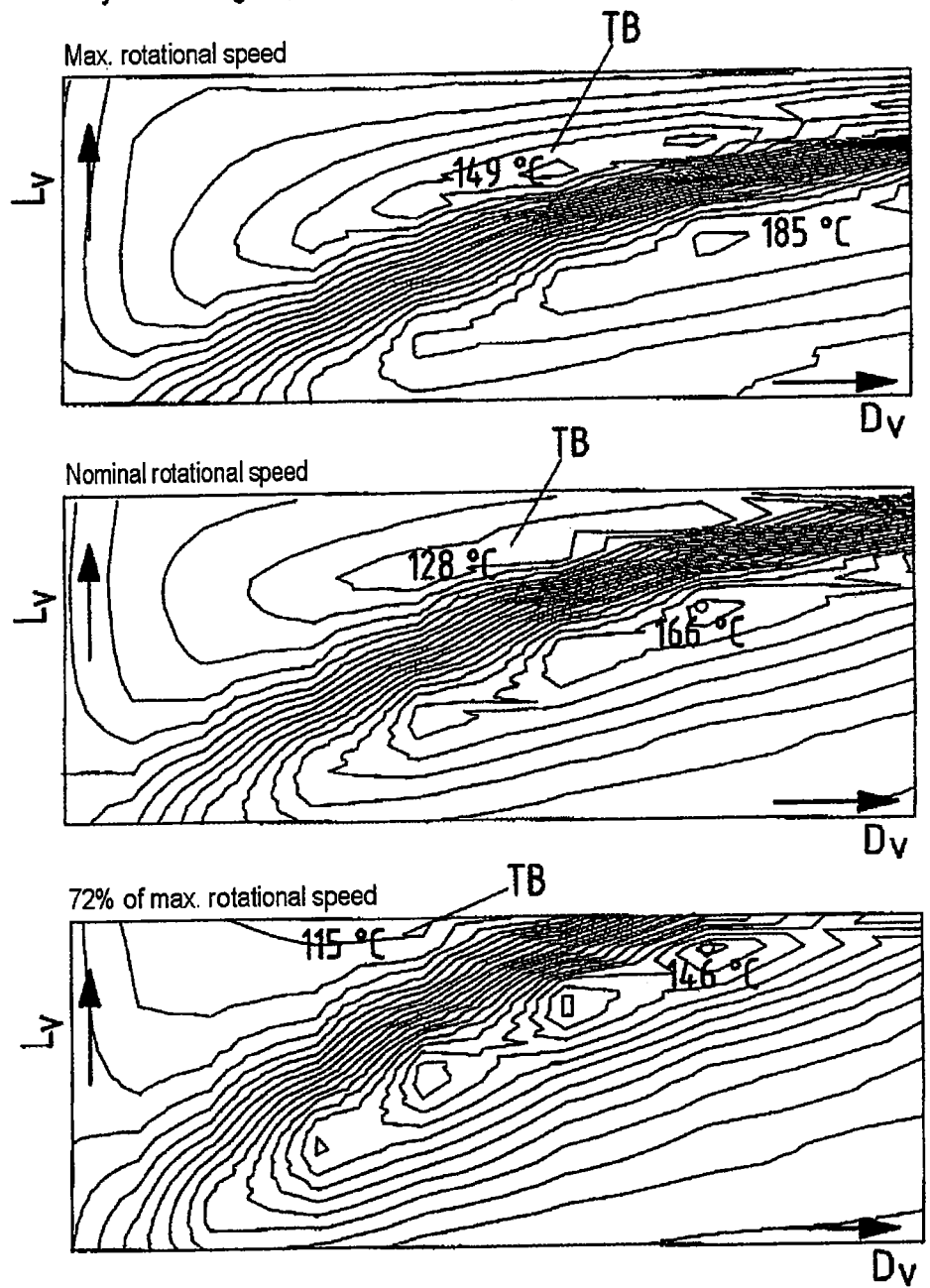
FIG. 12 is a schematic illustration of the temperature values of the cylinder charge in the combustion chamber of an internal combustion engine according to aspects of the invention at the time "inlet valve closes" as a function of the set rotational speed.

FIG. 12 shows exemplary profiles of the charge temperature $T_B$ in the combustion chamber after the end of the inflow of expanded charge air into the combustion chamber. The three images from FIG. 12 illustrate different temperature values as a function of the rotational speed of the internal combustion engine 1. It is therefore possible by means of the additional switchable distributor pipe 12 to set a certain equivalent distributor pipe diameter $D_V$ as a function of operating parameters of the internal combustion engine, such as the rotational speed, and to thereby obtain a tuned expansion of the charge air. Accordingly, it is made possible to set a lowest temperature of the charge air at the time of inlet into the combustion chamber as a function of the operating parameters, such that optimum efficiency is obtained at the respective operating point of the internal combustion engine 1.

Figure 9:
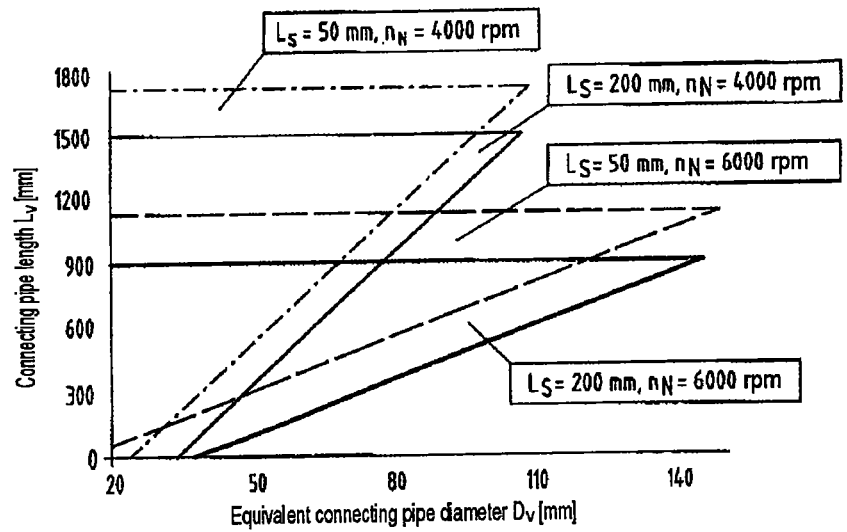
FIG. 9 shows a schematic image of the dimensional ratios of the air intake system of the internal combustion engine according to aspects of the invention.

The expansion intake system 3 according to aspects of the invention and its design are explained in more detail below. The schematic illustration in FIG. 9 of the dimensional ratios of the air intake system 3 as per FIG. 1 are derived in accordance with the temperature profiles of the charge air in FIG. 12. Here, the triangles illustrated in FIG. 9 illustrate the temperature ranges with the low temperature values of the charge air from FIG. 12. Here, the distributor pipe length $L_V$ is to be selected as a function of the equivalent distributor pipe diameter $D_V$ so as to give a point of intersection within one of the triangles shown in FIG. 9. With such a design, in the expansion intake system 3 according to aspects of the invention, a corresponding charge-air temperature $T_{Min}$ as per FIG. 12 is generated at the inlet of the combustion chamber.

Figure 11:
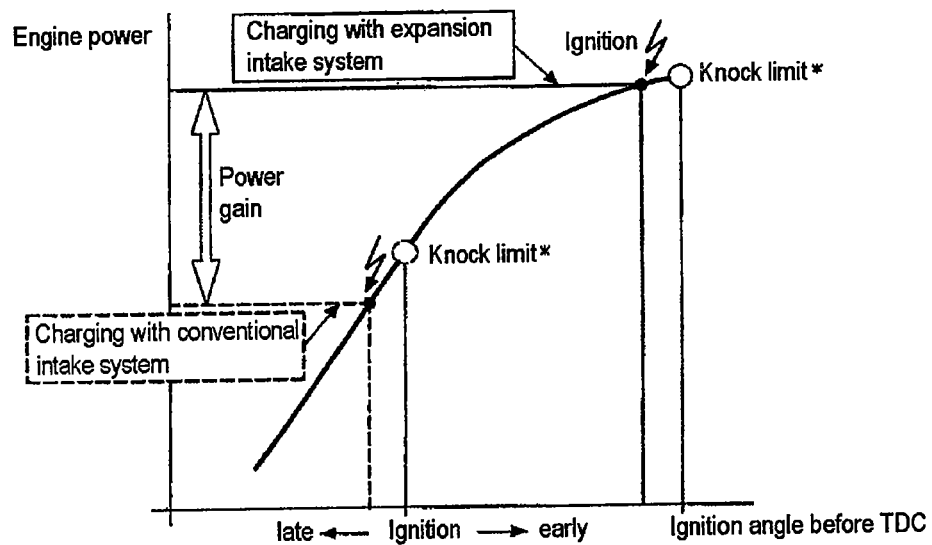
FIG. 11 is a schematic illustration of the effect of the air intake system as per FIG. 1 on the engine power of an internal combustion engine.

The geometric design of the air intake system 3 leads to a charge air expansion which is such that the expansion phase of the charge air oscillation lies in the second half of the second intake process as per FIG. 8, upper diagram. In FIG. 8, the second half of the intake process, the lowest temperature values of the charge air occur in the expansion phase. The relatively cold air masses which are sucked in result, according to aspects of the invention, in a combustion chamber cylinder charge with a relatively low temperature. This effect causes the knock limit to be displaced in the early direction as per FIG. 11, so as to permit an earlier ignition.

Accordingly, the engine power can be increased by virtue of the ignition time of the internal combustion engine 1 being set earlier than in the case of a relatively warm cylinder charge. This leads to a significant increase in power. As a result of the obtained reduced knock tendency, it is conceivable for the compression ratio of the internal combustion engine to be raised.

In order to compensate the obtained expansion in the air intake system 3, a suitable charge pressure is set by means of the compressor 8, which charge pressure is higher than in conventional supercharged internal combustion engines. An increase in the charge pressure with the present expansion air intake system 3 can for example be between 0.15 and 0.3 bar higher than in conventional intake systems. A charge pressure increase of said type results in a charge-air temperature increase by approximately 10 degrees upstream of the charge-air cooler 9, with a charge-air temperature increase of approximately 2 to 3 degrees being measured downstream of the charge-air cooler 9.

Figure 10:
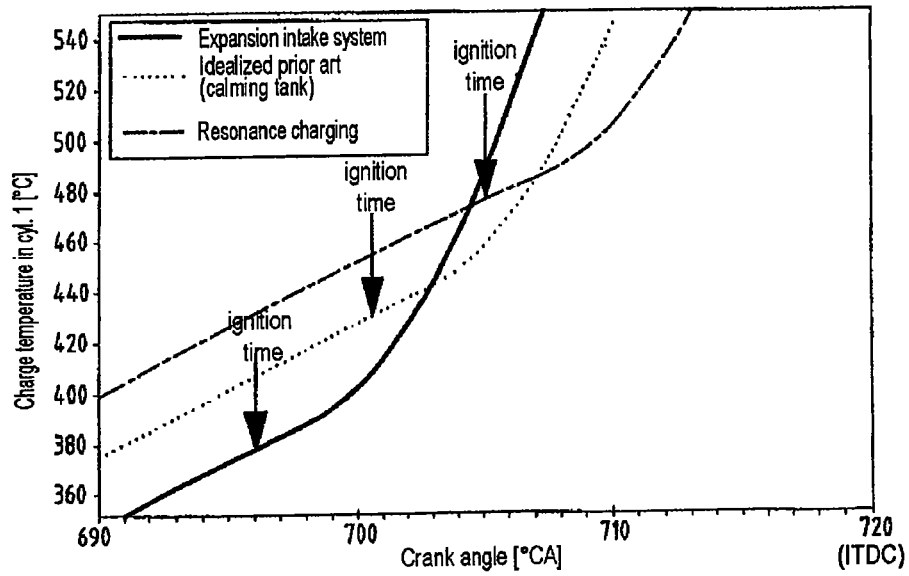
FIG. 10 is a schematic illustration of the charge temperature in the combustion chamber of an internal combustion engine.

Accordingly, a further reduction in the charge-air temperature is brought about by means of the generated expansion, such that a lower charge-air temperature than the conventional temperatures as per FIGS. 8 and 10 is obtained at the inlet of the combustion chamber while maintaining the desired charge pressure level. The relatively high air throughput in the combustion chamber is therefore maintained, and at the same time, a power increase is obtained as a result of the displacement of the knock limit of the internal combustion engine 1 as per FIGS. 10 and 11.

The invention relates to a supercharged internal combustion engine 1 having a plurality of cylinders 2 and an air intake system 3, with the air intake system 3 being formed from at least one distributor pipe 4, a plurality of intake pipes 7 and two plenums 6, with the respective plenum 6 being positioned between the distributor pipe 4 and the intake pipes 7. Here, the combustion air is fed to the air intake system 3 via an air guiding duct 5 which opens out into the distributor pipe 4, with the charge pressure of the combustion air being reduced between the outlet out of the compressor 8 and the inlet into the combustion chamber of the internal combustion engine 1.

According to aspects of the invention, a distributor pipe length $L_V$ is dimensioned as a function of an equivalent distributor pipe diameter $D_V$ such that it is possible for a reduction in the charge pressure to be obtained within the air intake system 3 by means of an expansion, with the expansion taking place in the plenum, in the respective intake pipe 7 and/or within the distributor pipe 4. Here, the invention is suitable for engines of the Boxer type with four or six cylinders, in particular for Boxer engines having an exhaust-gas turbocharger which has an adjustable turbine geometry.

The invention claimed is:

1. An internal combustion engine comprising:
    a plurality of cylinders,
    an air intake system,
    a compressor for feeding combustion air,
    a combustion chamber which is arranged in each cylinder and which is delimited between a piston and a cylinder head of each respective cylinder,
    wherein the air intake system is formed from at least one distributor pipe, a plurality of intake pipes and at least one plenum, with the plenum being positioned between the distributor pipe and the intake pipes,
    wherein the combustion air is fed to the air intake system via an air guiding duct which opens out into the distributor pipe,
    wherein the air intake system is configured such that a charge pressure of the combustion air is reduced as the combustion air travels from an outlet out of the compressor to an inlet into the combustion chamber of the internal combustion engine during an intake of the combustion air through the air intake system, and
    wherein a distributor pipe length is dimensioned as a function of an equivalent distributor pipe diameter to facilitate a reduction in the charge pressure to be obtained within the air intake system by an expansion, with the expansion occurring at least partially in the plenum, in a respective intake pipe and/or within the distributor pipe.

2. The internal combustion engine as claimed in claim 1, wherein the distributor pipe length is dimensioned as a function of a nominal rotational speed of the internal combustion engine and/or of an intake pipe length.

3. The internal combustion engine as claimed in claim 1, wherein a length of the distributor pipe is configured as a function of an equivalent distributor pipe diameter such that a ratio of equivalent distributor pipe diameter to distributor pipe length is between about 0.05 and about 0.14.

4. The internal combustion engine as claimed in claim 1, wherein the air intake system is configured such that a length of the intake pipe is shorter than 200 millimeters.

5. The internal combustion engine as claimed in claim 1, wherein the air intake system has two plenums, with the distributor pipe being formed from a distributor module and two distributor pipe sections, with each distributor pipe section being positioned between the distributor module and one of the plenums.

6. The internal combustion engine as claimed in claim 1, wherein the internal combustion engine is embodied as a four or six cylinder spark-ignition internal combustion engine of the Boxer type.

7. The internal combustion engine as claimed in claim 1, wherein the distributor pipe length is greater than a length $L_1$ which is defined by a formula: $L_1=200-4/3*L_S+1.7*n_N^{-2.22}*(Dv-30)$, where $L_S$ corresponds to a respective intake pipe length, $n_N$ corresponds to a nominal rotational speed of the internal combustion engine and $D_V$ corresponds to an equivalent distributor pipe diameter.

8. The internal combustion engine as claimed in claim 1, wherein the distributor pipe length is smaller than a length which is defined by a formula: $L_2=7.2*10^6/n_N-1.5*L_S$, where $L_S$ corresponds to a respective length of the intake pipe and $n_N$ corresponds to a nominal rotational speed of the internal combustion engine.

9. The internal combustion engine as claimed in claim 1, wherein the distributor pipe length is greater than a length which is defined by a formula: $L_3=34*D_V-650*4/3\,L_S$, where $L_S$ corresponds to a respective intake pipe length and $D_V$ corresponds to an equivalent distributor pipe diameter.

10. The internal combustion engine as claimed in claim 1 further comprising a second switchable distributor pipe.

11. The internal combustion engine as claimed in claim 10 further comprising a switching flap in the second distributor pipe, wherein a size of an equivalent distributor pipe diameter can be adjusted by the switching flap.

12. The internal combustion engine as claimed in claim 1, wherein the internal combustion engine has an exhaust-gas turbocharger with a variable turbine geometry.

13. The internal combustion engine as claimed in claim 1, wherein an additional increase in the charge pressure by the compressor can be adjusted, with the adjusted charge pressure values being between about 5% and about 15% higher than a value which is between about 0.9 bar and about 1.5 bar.

14. The internal combustion engine as claimed in claim 1, wherein the expansion which can be obtained within the air intake system can be adjusted as a function of operating parameters.

15. The internal combustion engine as claimed in claim 14, wherein one operating parameter is a rotational speed of the internal combustion engine.

16. The internal combustion engine as claimed in claim 1, wherein a length of the distributor pipe is configured as a function of an equivalent distributor pipe diameter such that a ratio of equivalent distributor pipe diameter to distributor pipe length is between about 0.06 and about 0.13.

* * * * *